US007656966B2

(12) United States Patent
Walker et al.

(10) Patent No.: US 7,656,966 B2
(45) Date of Patent: Feb. 2, 2010

(54) METHOD TO INCREASE PERFORMANCE OF SECONDARY DATA IN A HEIRARCHIAL MODULATION SCHEME

(75) Inventors: Glenn A. Walker, Greentown, IN (US); Eric A. Dibiaso, Kokomo, IN (US); Michael L. Hiatt, Jr., Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 314 days.

(21) Appl. No.: 11/789,600

(22) Filed: Apr. 25, 2007

(65) Prior Publication Data
US 2007/0195868 A1    Aug. 23, 2007

Related U.S. Application Data

(62) Division of application No. 10/847,944, filed on May 18, 2004, now Pat. No. 7,230,998.

(60) Provisional application No. 60/525,616, filed on Nov. 26, 2003.

(51) Int. Cl.
*H04L 27/20* (2006.01)
(52) U.S. Cl. ............... 375/308; 375/211; 375/324; 375/349; 375/346; 375/219; 455/3.02
(58) Field of Classification Search ............ 375/308, 375/324, 349, 346, 211, 219, 220, 215; 455/3.01, 455/3.02, 428
See application file for complete search history.

(56) References Cited

U.S. PATENT DOCUMENTS

| 5,646,935 A | 7/1997 | Ishilawa et al. |
| 5,687,166 A | 11/1997 | Natali et al. |
| 5,966,412 A | 10/1999 | Ramaswamy |
| 6,119,827 A | 9/2000 | Militello et al. |

6,510,317 B1    1/2003    Marko et al.

(Continued)

FOREIGN PATENT DOCUMENTS

EP    0594505    10/1993

(Continued)

OTHER PUBLICATIONS

EP Search Report Dated Dec. 20, 2007.

(Continued)

*Primary Examiner*—Phuong Phu
(74) *Attorney, Agent, or Firm*—Jimmy L. Funke

(57) ABSTRACT

This invention provides a receiver for use in a SDAR system which includes a receiving unit having satellite signal detection means for detecting a first transmit signal transmitted from a first communication satellite and a second transmit signal transmitted from a second communication satellite, the first transmit signal produced when the transmitter modulates a primary data stream with a secondary data stream on a first carrier wave associated with the first communication satellite and the second transmit signal produced when the transmitter modulates the primary and secondary data streams on a second carrier wave associated with the second communication satellite, and an encoder re-encodes the primary and the secondary data on a third carrier wave, forming a third transmit signal which is re-transmitted to a receiver using a terrestrial repeater. This invention also provides a method of receiving transmitted data.

38 Claims, 7 Drawing Sheets

U.S. PATENT DOCUMENTS

| | | | |
|---|---|---|---|
| 6,570,858 | B1 | 5/2003 | Emmons, Jr. et al. |
| 6,741,834 | B1 * | 5/2004 | Godwin .................... 455/3.01 |
| 6,823,169 | B2 * | 11/2004 | Marko et al. ............... 455/3.02 |
| 7,000,241 | B2 | 2/2006 | Klauss et al. |
| 7,065,355 | B2 | 6/2006 | Spio |
| 2005/0005120 | A1 | 1/2005 | Kahn et al. |

FOREIGN PATENT DOCUMENTS

| | | |
|---|---|---|
| EP | 1113607 | 7/2001 |
| WO | 0139454 | 5/2001 |
| WO | 2004/100479 | 11/2004 |

OTHER PUBLICATIONS

J. Sesna; The DBV satellite, cable and SMATV systems; EBU Technical Review; Winter 1995; pp. 24-38.

Tanner; UBS Looks Southward, UBS, a Canadian Developer of MMDS Equipment, Has Its Eyes on the U.S.; Aug. 2001; www.shorecliffordcommunications.com, Broadband Wireless Online, pp. 1-6.

Yoshida; new DBC satellite modulation scheme drops Turbo; Mar. 7, 2003; EETIMESUK, www.electronicstimes.com; p. 1.

Schertz, Weck; Hierarchical modulation-the transmission of two independent DVB-T multiplexes on a single frequency; EBU Technical Review; Apr. 20003; pp. 1-13.

DBV Digital Broadcasting; DVB, MHP, the DVB logo and the MHP logo are registered trademarks of the Digital Video Broadcasting Project.

Pursley, et al.; "Adaptive Nonuniform Phase-Shift-Key Modulation for Multimedia Traffic in Wireless networks"; IEEE Journal on Selected Areas in Communications, vol. 18, No. 8, Aug. 2000; pp. 1394-1407.

Vitthaladevuni, et al.; Effect of Imperfect Phase and Timing Synchronization on the Error Rate performance of PSK Modulations; IEEE Mar. 2002; pp. 356-360.

Hossain, et al.; Hierarchial Modulations for Multimedia and Multicast Transmission over Fading Channels; IEEE Mar. 2003; pp. 2633-2637.

Pursley, et al.; "Nonuniform Phase-Shift-Key modulation for Multimedia Multicast Transmission in Mobile Wireless Networks"; IEEE Journal on Selected Areas in Communications, vol. 17, No. 5, May 1999, pp. 774-783.

Vittaladevuni, et al.; "Exact BER computation of Generalized Hierarchial PSK Constellations"; IEEE Feb. 2002, pp. 1974-1978.

* cited by examiner

METHOD TO INCREASE PERFORMANCE OF SECONDARY DATA IN A HEIRARCHIAL MODULATION SCHEME

This application is a divisional application of U.S. patent application Ser. No. 10/847,944, filed May 18, 2004 now U.S. Pat. No. 7,230,998, which claims priority to U.S. Provisional Patent Application No. 60/525,616, filed on Nov. 26, 2003.

TECHNICAL BACKGROUND

The present invention generally relates to the transmission of digital data, and more particularly, to the transmission of digital data in a satellite digital audio radio ("SDAR") system.

BACKGROUND OF THE INVENTION

In October of 1997, the Federal Communications Commission (FCC) granted two national satellite radio broadcast licenses. In doing so, the FCC allocated twenty-five (25) megahertz (MHz) of the electromagnetic spectrum for satellite digital broadcasting, twelve and one-half (12.5) MHz of which are owned by XM Satellite Radio, Inc. of Washington, D.C. (XM), and 12.5 MHz of which are owned by Sirius Satellite Radio, Inc. of New York City, N.Y. (Sirius). Both companies provide subscription-based digital audio that is transmitted from communication satellites, and the services provided by these and other SDAR companies are capable of being transmitted to both mobile and fixed receivers on the ground.

In the XM satellite system, two (2) communication satellites are present in a geostationary orbit—one satellite is positioned at longitude 115 degrees (west) and the other at longitude eighty-five (85) degrees (east). Accordingly, the satellites are always positioned above the same spot on the earth. In the Sirius satellite system, however, three (3) communication satellites are present that all travel on the same orbital path, spaced approximately eight (8) hours from each other. Consequently, two (2) of the three (3) satellites are "visible" to receivers in the United States at all times. Since both satellite systems have difficulty providing data to mobile receivers in urban canyons and other high population density areas with limited line-of-sight satellite coverage, both systems utilize terrestrial repeaters as gap fillers to receive and re-broadcast the same data that is transmitted in the respective satellite systems.

In order to improve satellite coverage reliability and performance, SDAR systems currently use three (3) techniques that represent different kinds of redundancy known as diversity. The techniques include spatial diversity, time diversity and frequency diversity. Spatial diversity refers to the use of two (2) satellites transmitting near-identical data from two (2) widely-spaced locations. Time diversity is implemented by introducing a time delay between otherwise identical data, and frequency diversity includes the transmission of data in different frequency bands. SDAR systems may utilize one (1), two (2) or all of the techniques.

The limited allocation of twenty-five (25) megahertz (MHz) of the electromagnetic spectrum for satellite digital broadcasting has created a need in the art for an apparatus and method for increasing the amount of data that may be transmitted from the communication satellites to the receivers in SDAR systems.

SUMMARY OF THE INVENTION

The present invention provides an apparatus and method for increasing the amount of digital data that may be transmitted from communication satellites to receivers in SDAR systems. In doing so, the present invention provides an advantage over the prior art. While hierarchical modulation schemes have been previously used in other data transmission applications (e.g., Digital Video-Broadcasting-Terrestrial [DVB-T] and DVB-Satellite [DVB-S] systems), until now, such hierarchical modulation schemes have not been envisioned for use in SDAR systems. By introducing the use of hierarchical modulation in SDAR systems, the present invention increases the amount of data that may be transmitted in SDAR systems and enables the enhanced performance of the receivers that receive the satellite-transmitted signals in SDAR systems.

In one form of the present invention, a receiver is provided, the receiver including a receiving unit having satellite signal detection means for detecting a first transmit signal transmitted from a first communication satellite and a second transmit signal transmitted from a second communication satellite, the first transmit signal produced when the transmitter modulates a primary data stream with a secondary data stream on a first carrier wave associated with the first communication satellite and the second transmit signal produced when the transmitter modulates the primary and secondary data streams on a second carrier wave associated with the second communication satellite; and at least one demodulator coupled to the receiving unit and configured to demodulate the at least one of the first and the second transmit signals.

In another form of the present invention, a method of receiving data is provided, the method including the steps of detecting a first transmit signal, the first transmit signal transmitted from a first communication satellite and comprising a first level data and a second level data modulated on a first carrier wave associated with the first communication satellite; detecting a second transmit signal, the second transmit signal transmitted from a second communication satellite and comprising the first level data and the second level data modulated on a second carrier wave associated with the second communication satellite; interpreting the first transmit signal; and providing the interpreted signal to an output unit.

In still another form, the present invention provides a terrestrial repeater used to re-transmit hierarchically modulated data, the repeater including a receiving unit for detecting a first transmit signal and a second transmit signal, the first transmit signal transmitted from a first communication satellite and produced when the transmitter modulates a primary and a secondary data on a first carrier wave associated with the first communication satellite, and the second transmit signal transmitted from a second communication satellite and produced when the transmitter modulates the primary and the secondary data on a second carrier wave associated with the second communication satellite; an encoder for re-encoding the primary and the secondary data on a third carrier wave to form a third transmit signal; and a re-transmitter for transmitting the third transmit signal to a receiver.

In yet another form of the present invention, a method of receiving transmitted data, the method including the steps of receiving a primary data stream and a secondary data stream from both a first communication satellite and a second communication satellite, the primary data stream having a first data rate and the secondary data stream having a second data rate; determining the validity of the first and the second data streams; and hierarchically modulating the primary and the secondary data streams to form a combined data stream when the secondary data stream is determined to be an enhancement to the primary data stream, wherein the combined data stream has a third data rate greater than the first data rate.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
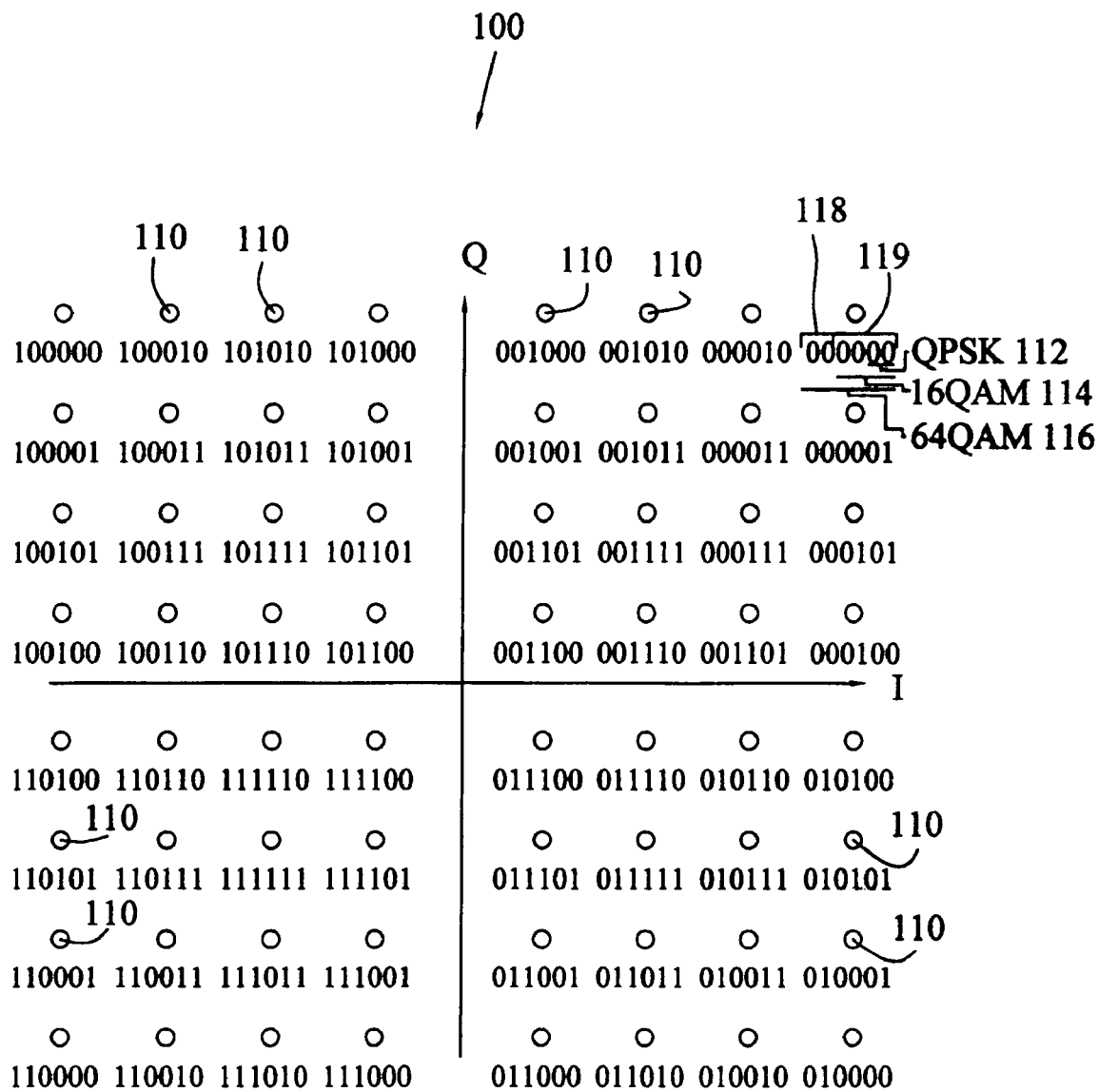
FIG. 1 is an illustrative view of a constellation chart for 64-quadrature amplitude modulation (QAM) with an embedded quadrature phase shift keying (QPSK) stream.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted in accordance with the following definitions.

"Feed forward correction" is a method of improving secondary data (defined infra) detection. By knowing the relative "I" (in-phase) and "Q" (quadrature) components of a constellation quadrant, the detector may be enhanced to perform better by having a priori knowledge to assist detection.

"First level data" and/or "primary data" hereinafter refers to existing data that may be interpreted by current (i.e., "legacy") SDAR receivers. Because the first level data can be interpreted by the legacy receivers, the first level data may also be considered to have backwards compatibility.

"Hierarchical modulation" hereinafter describes when two separate data or bit streams are modulated onto a single data stream. Essentially, an additional data stream is superimposed upon, mapped on, or embedded within the primary data transmission. The additional data stream may have a different data rate than the primary data stream. As such, the primary data is more susceptible to noise than it would be in a non-hierarchical modulation scheme. By using a different coding algorithm, the usable data of the additional stream may be transmitted with a different level of error protection than the primary data stream. Broadcasters of SDAR services may use the additional and primary data streams to target different types of receivers, as will be explained below.

"Legacy receiver" hereinafter describes a current or existing SDAR receiver that is capable of interpreting first level data. Legacy receivers typically interpret second level data as noise.

"Second generation receiver" hereinafter describes a SDAR receiver that contains hardware and/or software enabling the receiver to interpret second level data (e.g., demodulator enhancements). Second generation receivers may also interpret first level data.

"Second level data", "secondary data" and/or "hierarchical data" hereinafter refers to the additional data that is superimposed on the first level data to create a hierarchically modulated data stream. Second level data may be interpreted by SDAR receivers containing the appropriate hardware and/or software to enable such interpretation (i.e., "second generation" receivers). Second level, or secondary, data may perform differently from first level, or primary, data.

QAM is one form of multilevel amplitude and phase modulation that is often employed in digital data communication systems. Using a two-dimensional symbol modulation composed of a quadrature (orthogonal) combination of two (2) pulse amplitude modulated signals, a QAM system modulates a source signal into an output waveform with varying amplitude and phase. Data to be transmitted is mapped to a two-dimensional, four-quadrant signal space, or constellation. The QAM constellation employs "I" and "Q" components to signify the in-phase and quadrature components, respectively. The constellation also has a plurality of phasor points, each of which represent a possible data transmission level. Each phasor point is commonly called a "symbol," represents both I and Q components and defines a unique binary code. An increase in the number of phasor points within the QAM constellation permits a QAM signal to carry more information.

Many existing systems utilize QPSK modulation systems. In such QPSK systems, a synchronous data stream is modulated onto a carrier frequency before transmission over the satellite channel, and the carrier can have four (4) phase states, e.g., 45 degrees, 135 degrees, 225 degrees or 315 degrees. Thus, similar to QAM, QPSK employs quadrature modulation where the phasor points can be uniquely described using the I and Q axes. In contrast to QAM, however, the pair of coordinate axes in QPSK can be associated with a pair of quadrature carriers with a constant amplitude, thereby creating a four (4) level constellation, i.e., four (4) phasor points having a phase rotation of 90 degrees. Differential quadrature phase shift keying (D-QPSK) refers to the procedure of generating the transmitted QPSK symbol by calculating the phase difference of the current and the preceding QPSK symbol. Therefore, a non-coherent detector can be used for D-QPSK because it does not require a reference in phase with the received carrier.

Hierarchical modulation, used in DVB-T systems as an alternative to conventional QPSK, 16-QAM and 64-QAM modulation methods, may better be explained with reference to FIG. 1. FIG. 1 illustrates 64-QAM constellation 100. Each permissible digital state is represented by phasors 110 in the I/Q plane. Since eight (8) by eight (8) different states are defined, sixty-four (64) possible values of six (6) bits may be transmitted in 64-QAM constellation 100. FIG. 1 shows the assignment of binary data values to the permissible states. In a 16-QAM constellation, there are four (4) by four (4) different states and four (4) transmitted bits, in a 4-PSK constellation, there are two (2) by two (2) states and two (2) transmitted bits, and in a BPSK constellation, there is one (1) state and one (1) transmitted bit.

In systems employing hierarchical modulation schemes, the possible states are interpreted differently than in systems using conventional modulation techniques (e.g., QPSK, 16-QAM and 64-QAM). By treating the location of a state within its quadrant and the number of the quadrant in which the state is located as a priori information, two separate data streams may be transmitted over a single transmission channel. While 64-QAM constellation 100 is still being utilized to map the data to be transmitted, it may be interpreted as the combination of a 16-QAM and a 4-PSK modulation. FIG. 1 shows how 64-QAM constellation 100, upon which is mapped data transmitted at six (6) bits/symbol 116, may be interpreted as including QPSK constellation 112 (which includes mapped data transmitted at two (2) bits/symbol) combined with 16-QAM constellation 114 (which includes mapped data transmitted at four (4) bits/symbol). The combined bit rates of QPSK and the 16-QAM data steams is equal to the bit rate of the 64-QAM data stream.

In systems employing hierarchical modulation schemes, one (1) data stream is used as a secondary data stream while the other is used as a primary data stream. The secondary data stream typically has a lower data rate than the primary stream. Again referring to FIG. 1, using this hierarchical modulation scheme, the two (2) most significant bits 118 may be used to transmit the secondary data to second generation receivers while the remaining four (4) bits 119 may be used to code the primary data for transmission to the legacy receivers.

Figure 2:
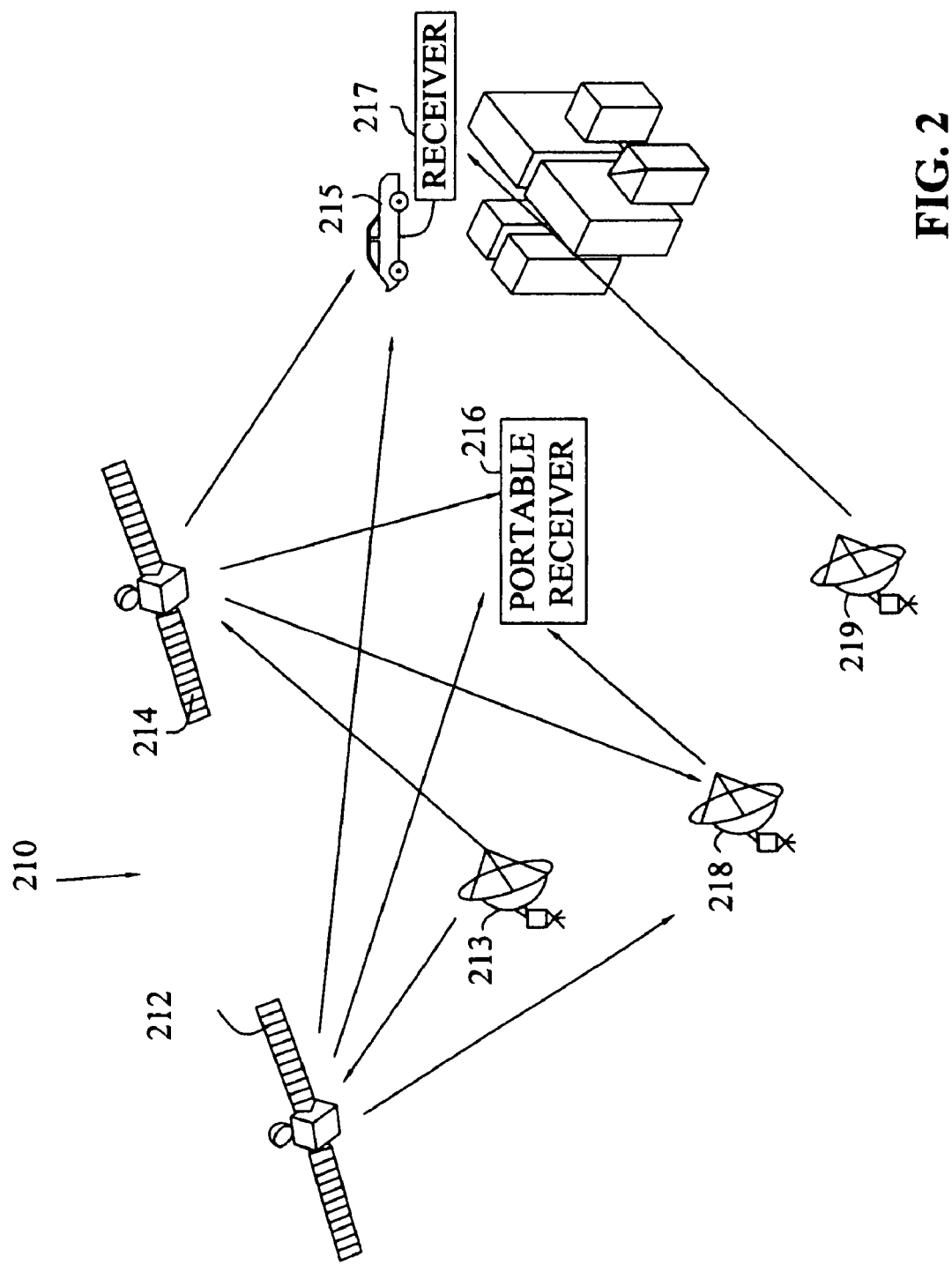
FIG. 2 is a diagrammatic view of a SDAR system implementing a method of the present invention.

The present invention contemplates the use of hierarchical modulation in a SDAR system, while maintaining backward compatibility for legacy receivers. Shown in FIG. 2 is a diagrammatic view of a SDAR system in which a hierarchical modulation scheme is employed. SDAR system 210 includes first and second communication satellites 212, 214, which transmit line-of-sight signals to SDAR receivers 216, 217 located on the earth's surface. A third satellite may be included in other SDAR systems. Satellites 212, 214, as indicated above, may provide for spatial, frequency and time diversity. As shown, receiver 216 is a portable receiver such as a handheld radio or wireless device. Receiver 217 is a mobile receiver for use in vehicle 215. SDAR receivers 216, 217 may also be stationary receivers for use in a home, office or other non-mobile environment.

SDAR system 210 further includes a plurality of terrestrial repeaters 218, 219. Terrestrial repeaters 218, 219 receive and retransmit the satellite signals to facilitate reliable reception in geographic areas where the satellite signals are obscured from the view of receivers 216, 217 by obstructions such as buildings, mountains, canyons, hills, tunnels, etc. The signals transmitted by satellites 212, 214 and terrestrial repeaters 218, 219 are received by receivers 216, 217, which either combine or select one of the signals as receiver's 216, 217 output.

Figure 3:
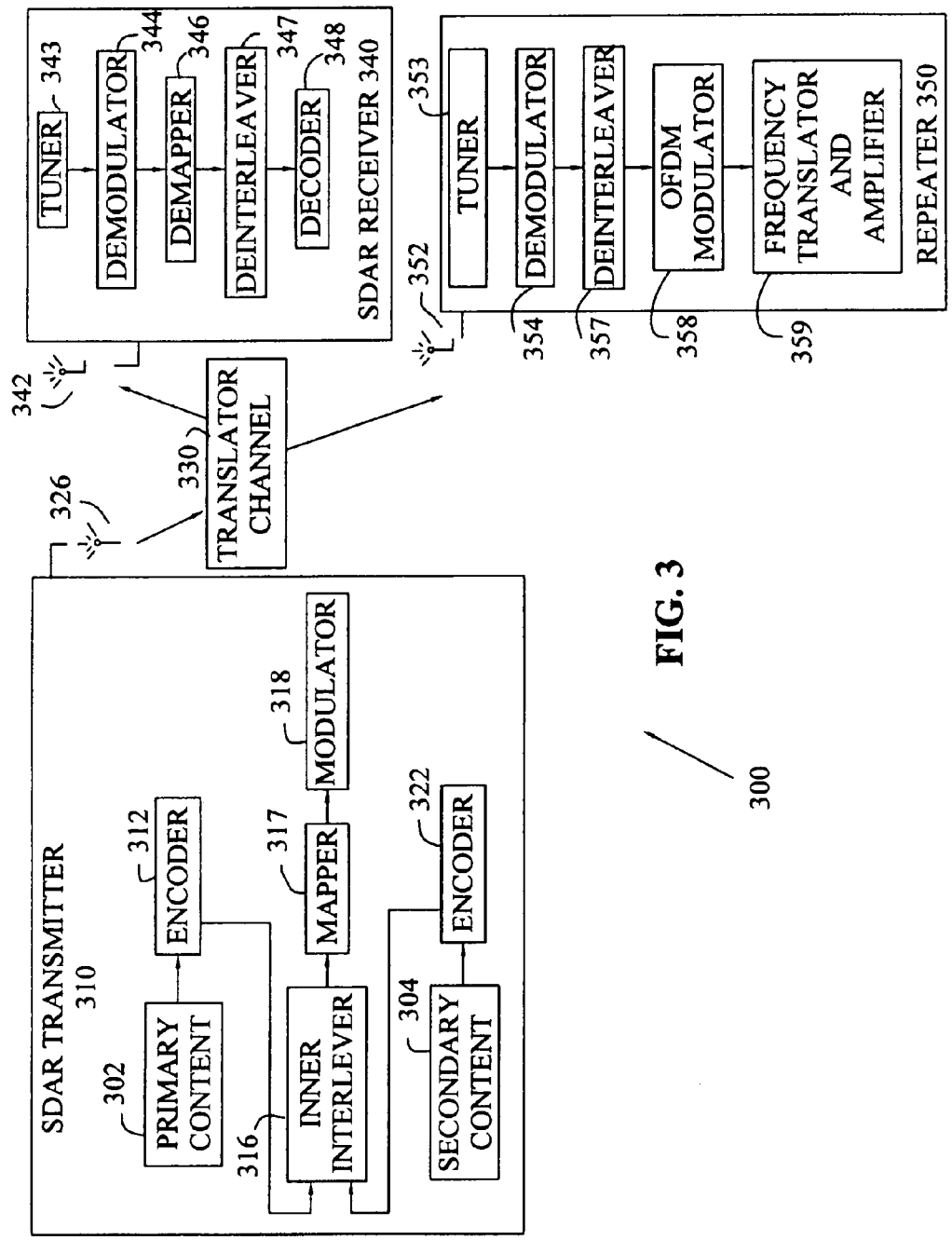
FIG. 3 is a block diagram of a SDAR communication system adapted to enable a method of the present invention.

FIG. 3 illustrates a block diagram of a SDAR communication system in which hierarchical modulation is utilized. In an exemplary embodiment of the present invention, SDAR communication system 300 includes SDAR transmitter 310, SDAR receiver 340 and terrestrial repeater 350. As in conventional SDAR communication systems, SDAR communication system 300 will input data content 302, 304 and perform processing and frequency translation within transmitter 310. The digital data is transmitted over transmission channel 330 to receiver 340 or terrestrial repeater 350. Generally, receiver 340 performs the converse operations of transmitter 310 to recover data 302, 304. Repeater 350 generally retransmits data 302, 304 to receiver 340. Unlike conventional SDAR communication systems, however, transmitter 310, receiver 340 and repeater 350 of the present invention provide hardware enabling SDAR communication system 300 to utilize a hierarchical modulation scheme to transmit and receive more digital data than conventional systems.

SDAR transmitter 310 includes encoders 312, 322. The audio, video, or other form of digital content to be transmitted comprises primary input signal 302 and secondary input signal 304, which are typically arranged as series of k-bit symbols. Primary input signal 302 contains primary, or first level, data and secondary input signal 304 contains secondary, or second level, data. Encoders 312, 322 encode the k bits of each symbol as well as blocks of the k-bit symbols. In other embodiments of the present invention, separate encoders may be used to encode the blocks of k-bit symbols, for example, outer and inner encoders. In an exemplary embodiment of the present invention, encoder 312 may encode primary data stream 302 using a block or a convolutional forward error correction (FEC) algorithm, and encoder 322 may encode secondary data stream 304 using a turbo coding algorithm or a low density parity check FEC algorithm. It is contemplated that other FEC encoding methods may be utilized to encode primary and secondary data streams 302, 204, including, for example, Hamming codes, cyclic codes and Reed-Solomon (RS) codes.

Figure 6:
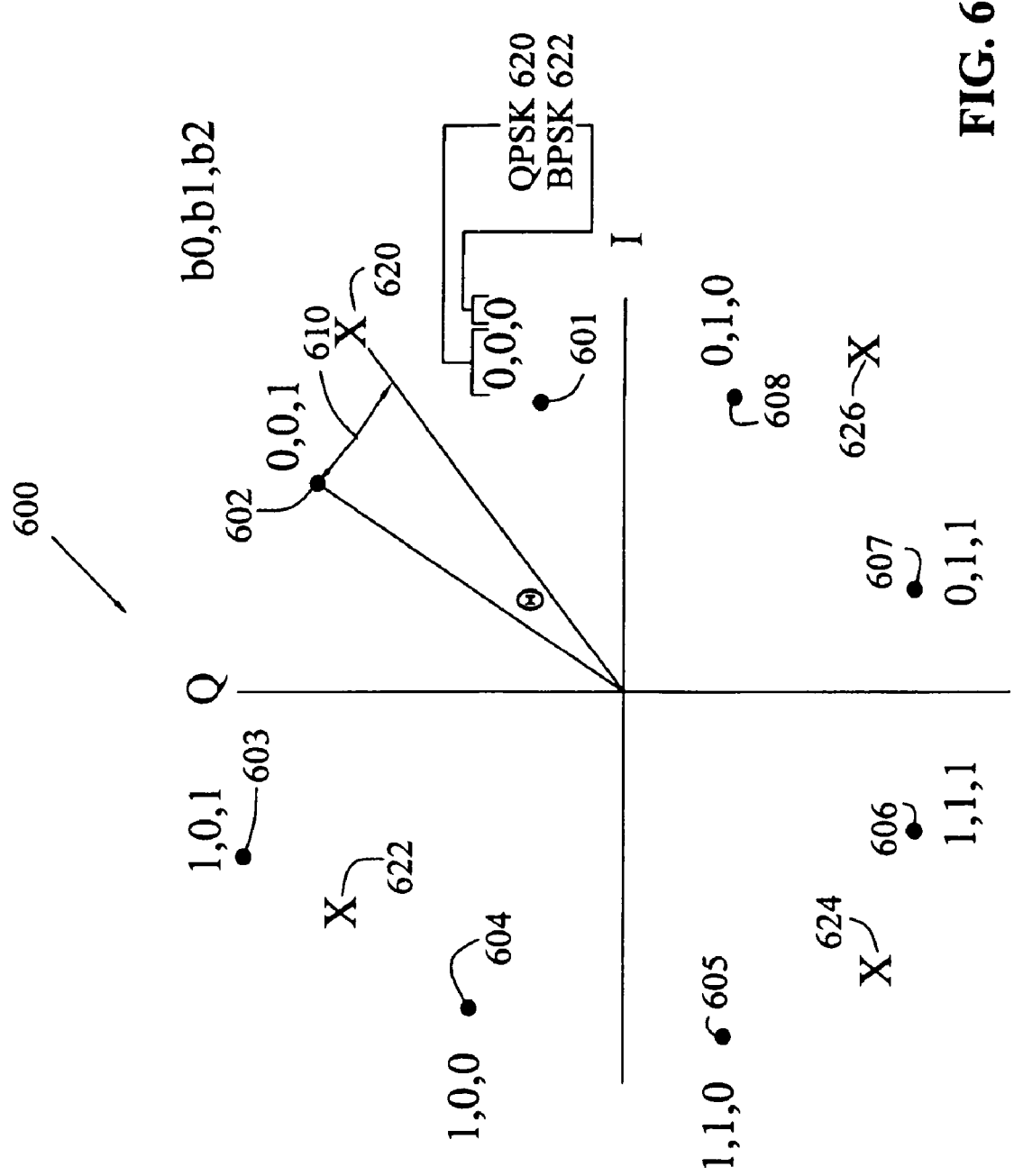
FIG. 6 is a diagrammatic view of a hierarchical 8-PSK constellation.

Again referring to FIG. 3, inner interleaver 316 multiplexes encoded secondary content data stream 304 with encoded primary content data stream 302 to form a transmit data stream. This transmit data stream is passed to mapper 317, which maps the data stream into symbols composed of I and Q signals. Mapper 317 may be implemented as a look-up table where sets of bits from the transmit signal are translated into I and Q components representing constellation points or symbols. FIG. 6 is representative of an exemplary embodiment of the present invention, in which a hierarchical modulation scheme is employed and the constellation points are in accordance with either a uniform or non-uniform 8-PSK constellation 600, where each phasor is represented by a three (3) bit symbol composed of I and Q signals.

Figure 4:
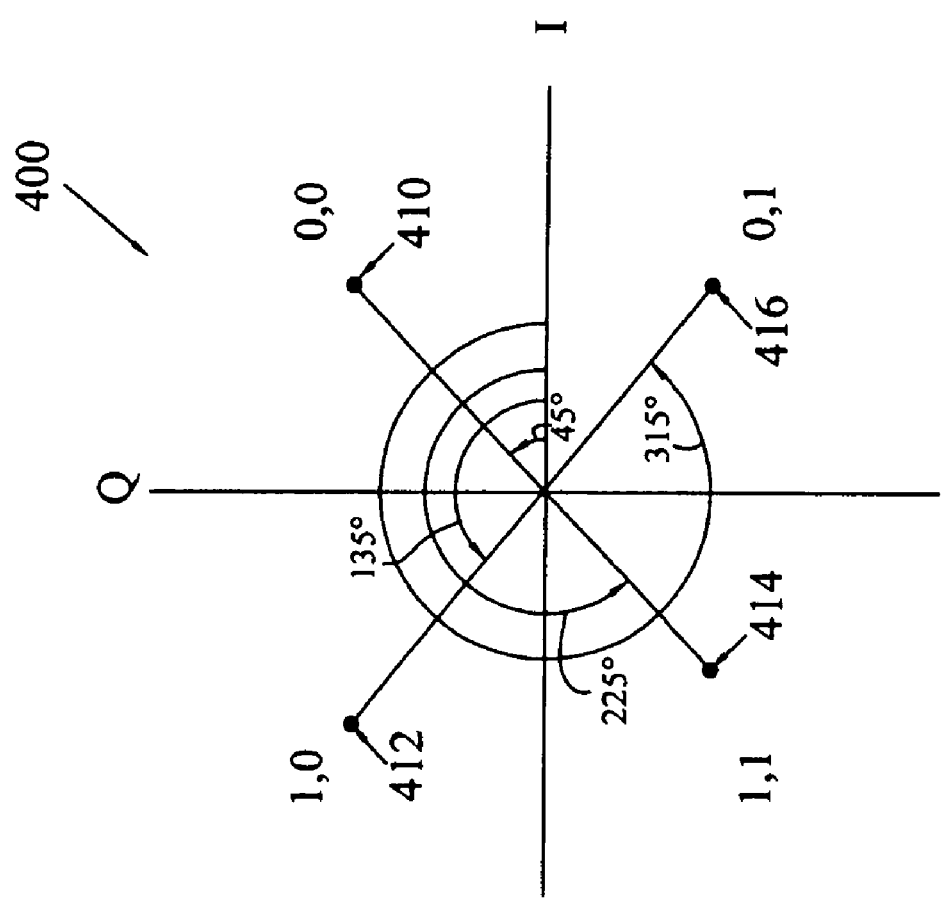
FIG. 4 is a diagrammatic view of a QPSK constellation.
Figure 5:
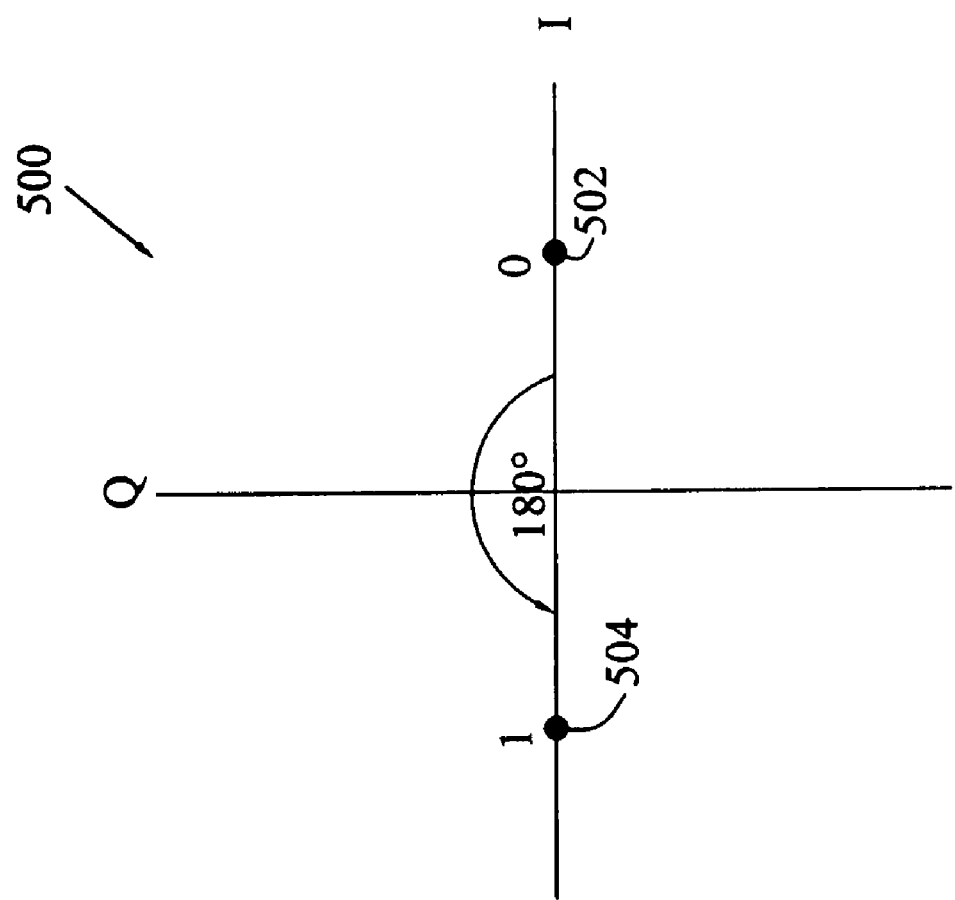
FIG. 5 is a diagrammatic view of a binary phase shift keying (BPSK) constellation.

FIG. 4 shows QPSK constellation 400 for primary data having two (2) transmitted bits/symbol. Phasors "00", "10", "11", "01" correlate to a phase of 45 degrees, a phase of 135 degrees, a phase of 225 degrees and a phase of 315 degrees, respectively. FIG. 5 shows BPSK constellation 500 for secondary data having one (1) transmitted bit/symbol. Phasors "0" and "1" correlate to a phase of zero (0) and 180 degrees, respectively. When a secondary data symbol is added onto a primary data symbol, constellation 600 of FIG. 6 is illustrative of the resulting hierarchical modulation.

Constellation 600 may be perceived as two (2) sets of superimposed modulations—QPSK constellation 400 transmitting two (2) bits/symbol 620 combined with BPSK constellation 500 comprising one (1) bit/symbol. The first modulation is the primary QPSK data, which is represented by "x" marks 620, 622, 624, 626. In order to superimpose the secondary data onto the primary data, the primary QPSK data is phase offset by the additional, secondary data, which is represented by any of data points 601, 602, 603, 604, 605, 606, 607, 608 depending on the phase offset. Positive phase offsets include phasors 602, 604, 606 and 608, and negative phase offsets include 601, 603, 605 and 607.

Shown in FIG. 6, phase offset 610 is the offset angle relative to the QPSK symbol. As explained above, a typical QPSK constellation contains 45 degree, 135 degree, 225 degree and 315 degree points. The hierarchical data is represented by a phase offset relative to those four (4) degree points, and the phase offsets with the four (4) degree points represent a hierarchical (8-PSK) constellation. A uniform 8-PSK constellation is created when offset angle 610 is 22.5 degrees. Every other offset angle 610 creates a non-uniform 8-PSK constellation. For example, as shown in FIG. 6, a 15 degree phase offset relative to primary data phasors 620, 622, 624, 626 produces a phase offset correlative to phasors 601 ("000") or 602 ("001"), 603 ("101") or 604 ("100"), 605 ("110") or 606 ("111"), and 607 ("011") or 608 ("010"), respectively. Gray coding is a method which may be used to make the bit assignments for the hierarchical constellation. For example, reference is made to the secondary data bit (b2). Instead of making b2=0 a negative offset and b2=1 a positive outset, the hierarchical constellation may be configured so as to increase the bit error rate (BER) performance (e.g., b2=1 can be made a negative offset).

The amount of the phase offset is equal to the amount of power in the secondary signal. The amount of energy in the secondary signal may not be equal to the amount of energy in the primary signal. As phase offset 610 is increased, the energy in the secondary data signal is also increased. The performance degradation to the primary data signal is minimized by the perceived coding gain improvement as phase offset 610 is increased. The application of the hierarchical phase modulation on top of an existing QPSK signal containing primary data causes phase offset 610 to adjust either positively or negatively relative to the hierarchical data.

In general, a secondary data bit causes either a larger Q magnitude and smaller I magnitude or a larger I magnitude and smaller Q magnitude. With FEC techniques utilized in encoders 312, 322, the I and Q signals are used in conjunction with each other over a block of data. These techniques give the appearance that the primary data bits are spread over time, enabling the secondary data to appear somewhat orthogonal to the primary data bits. Indeed, it has been shown in simulations that the secondary data's impact on the primary data is somewhat orthogonal. For example, for a twenty (20) degree phase offset for secondary data, the primary data has a one (1) decibel (dB) degradation when using a rate 1/3 convolutional code with a constraint length of seven (7), followed by a (255, 223) RS block code (8 bits/symbol). However, when the primary data has no FEC coding, the impact of the twenty (20) degree phase offset is 4.1 dB. This data demonstrates a perceived coding improvement of 3.1 dB in the case where phase offset 610 is set to twenty (20) degrees.

Again referring to FIG. 3, the FEC coding technique implemented by encoders 312, 322 spreads the primary and secondary data over many QPSK symbols, which essentially spreads the energy over time and the I and Q bits. To overcome the unequal signal-to-noise ratio ("Eb/No") between primary data bits and secondary data bits, the amount of phase offset 610 may be increased until the performance of the primary data is equal to the performance of the secondary data. However, as phase offset 610 is increased, legacy receivers may have a difficult time acquiring and tracking the desired primary data signal. By spreading the second level bits over multiple symbols, spread spectrum coding techniques may be used to increase the amount of energy in the secondary bits. This allows phase offset 610 to be adjusted and made more compatible with legacy receivers. Additionally, the use of second level data spreading reduces overall second level data throughput. Overall, several techniques may be utilized to maximize the performance of the secondary data. These techniques include: increasing phase offset 610 to maximize the secondary data energy per symbol; using multiple symbols per secondary data bit; using more complex FEC algorithms, and using a beam steering antenna to improve the performance of the secondary data (e.g., a higher gain directional antenna for stationary reception and a pointing/steering antenna for mobile reception).

Referring back to FIG. 3, after mapper 317 translates encoded and interleaved primary and secondary data streams 302, 304, respectively, into I and Q components, the I and Q components are modulated by modulator 318. Modulation enables both primary data stream 302 and secondary data stream 304 to be transmitted as a single transmission signal via antenna 326 over single transmission channel 330. Primary data stream 302 is modulated with secondary data stream 304 using one of a number of modulation techniques, including BPSK, QPSK, differential Q-PSK (D-QPSK) or pi/4 differential QPSK (pi/4 D-QPSK). According to the technique that modulator 318 employs, modulator 318 may be any of a QPSK, a D-QPSK or a pi/4 D-QPSK modulator. Each modulation technique is a different way of transmitting the data across channel 330. The data bits are grouped into pairs, and each pair is represented by a symbol, which is then transmitted across channel 330 after the carrier is modulated.

An increase in the capacity of the transmitted signal would not cause backwards compatibility problems with legacy receivers because the legacy receivers may interpret the first level data. Second generation receivers, however, are capable of interpreting both first and second level data. Techniques may be employed to minimize the degradation in the legacy receiver, including decreasing phase offset 610 to limit the amount of the second level data energy per symbol, limiting the amount of time over which the second level data is transmitted, and making the second level data energy appear as phase noise to the legacy receiver.

Referring back to FIG. 2, after modulator 318 modulates first data stream 302 and second level data stream 304 (FIG. 3) to create a transmission signal, transmitter 213 uplinks the transmission signal to communication satellites 212, 214. Satellites 212, 214, having a "bent pipe" design, receive the transmitted hierarchically modulated signal, performs frequency translation on the signal, and re-transmits, or broadcasts, the signal to either one or more of plurality of terrestrial repeaters 218, 219, receivers 216, 217, or both.

As shown in FIG. 3, terrestrial repeater 350 includes terrestrial receiving antenna 352, tuner 353, demodulator 354, de-interleaver 357, modulator 358 and frequency translator and amplifier 359. Demodulator 354 is capable of down-converting the hierarchically modulated downlinked signal to a time-division multiplexed bit stream, and de-interleaver 357 re-encodes the bit-stream in an orthogonal frequency division multiplexing (OFDM) format for terrestrial transmission. OFDM modulation divides the bit stream between a large number of adjacent subcarriers, each of which is modulated with a portion of the bit stream using one of the M-PSK, differential M-PSK (D-MPSK) or differential pi/4 M-PSK (pi/4 D-MPSK) modulation techniques. Accordingly, if a hierarchically modulated signal is transmitted to one or both terrestrial repeaters 218, 219 (FIG. 2), terrestrial repeaters 218, 219 receive the signal, decode the signal, re-encode the signal using OFDM modulation and transmit the signal to one or more receivers 216, 217. Because the signal contains both the first and second level data, the terrestrial signal maintains second level data bit spreading over multiple symbols.

Also shown in FIG. 3, SDAR receiver 340 contains hardware (e.g., a chipset) and/or software to process any received hierarchically modulated signals as well. Receiver 340 includes one or more antennas 342 for receiving signals transmitted from either communication satellites 212, 214, terrestrial repeaters 218, 219, or both (FIG. 2). Receiver 340 also includes tuner 343 to translate the received signals to baseband. Separate tuners may be used to downmix the signals received from communication satellites 212, 214 and the signals received from terrestrial repeaters 218, 219. It is also envisioned that one tuner may be used to downmix both the signals transmitted from communication satellites 212, 214 and the signals transmitted from repeaters 218, 219.

Once the received signal is translated to baseband, the signal is demodulated by demodulator 344 to produce the original I and Q components. De-mapper 346 translates the I and Q components into encoded primary and secondary data streams. These encoded bit streams, which were interleaved by interleaver 316, are recovered by de-interleaver 347 and passed to decoder 348. Decoder 348 employs known bit and block decoding methods to decode the primary and secondary bit streams to produce the original input signals containing the primary and secondary data 302, 304. In other embodiments of the present invention, multiple decoders may be used, e.g., outer and inner decoders. Receiver 340 may also use a feed forward correction technique to improve its detection of the secondary data. By knowing the relative I/Q quadrant, receiver 340 may be enhanced to perform better by having such a priori knowledge, which assists in the detection of the transmitted signal. Simulations have shown that the use of first level data in the feed forward correction technique enables the present invention to utilize corrected first level data symbols to optimize second level data performance as well as potentially improve second level data performance over SDAR communication systems utilizing non-feed forward correction techniques. For example, referring to FIG. 6, if it is known from a priori first level data knowledge that symbol 602 or 601 was transmitted at some point in time, and the received symbol lands at 604, it can be inferred by minimum distance that the received second level data bit is a weak one (1) by utilizing feed forward correction. However, without feed forward correction the second level data bit would have been detected as a strong zero (0). Therefore, feed forward detection utilizes the decoded symbol with the detected offset (either positive or negative) to determine the secondary data bit.

Figure 7:
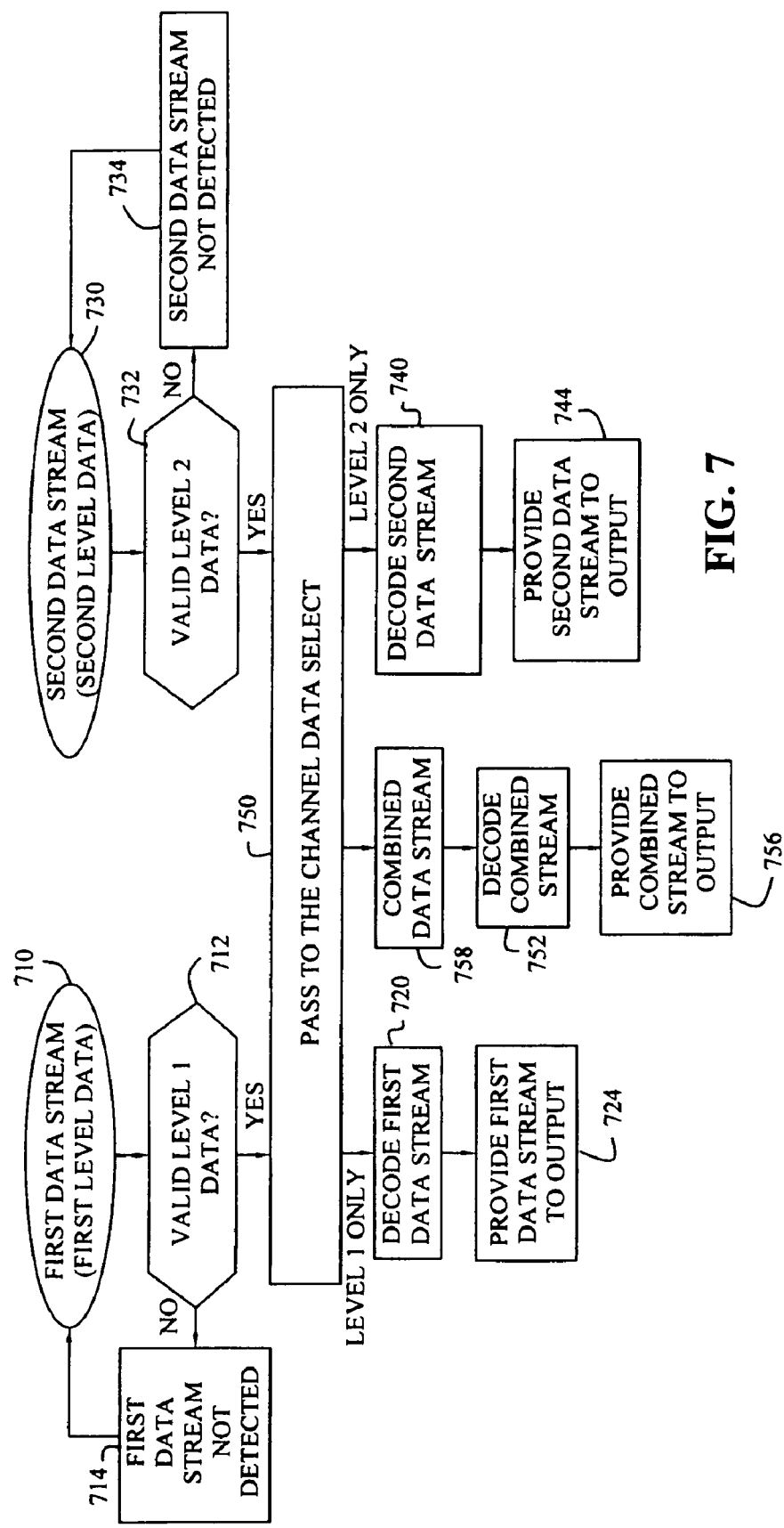
FIG. 7 is a flow chart illustrating a method of the present invention as utilized in a SDAR receiver.

In another embodiment of the present invention, a method of enabling extra data bits from a hierarchical modulation scheme to be used to transmit additional data for each channel in a SDAR system is contemplated. A flow chart illustrating this embodiment of the present invention as utilized in an SDAR communication system is shown in FIG. 7. It is contemplated that the inventive method would be carried out by a receiver adapted to be used in a SDAR system. The receiver may concurrently process the receipt of first data stream 710 and second data stream 730. If first data stream 710 is valid as determined by error checking at step 712, first data stream 710 is passed to a channel data select at step 750. If first data stream 710 is selected and second data stream 730 is either independent or not valid, only first data stream 710 is decoded at step 720 at its original rate, e.g., forty-eight (48) kbps. The decoded data from first data stream 710 is then passed to an output unit at step 724.

If second data stream 730 is valid as determined by error checking at step 732, then second data stream 730 is passed to the channel data select at step 750. If second data stream 730 is selected and is independent from first data stream 710, only second data stream 730 is decoded at step 740 at its original rate, e.g., sixteen (16) kbps. The decoded data from second data stream 730 is then passed to an output unit at step 744.

If the receiver determines at step 712 that first data stream 710 is valid and at step 732 that second data stream 730 is valid, both data streams are passed to the channel data select at step 750. The channel data select determines if second data stream 730 is an enhancement to first data stream 710. Audio enhancements may include audio quality enhancements, audio coding enhancements such as 5.1 audio (i.e., a Dolby® AC-3 digital audio coding technology in which 5.1 audio channels [left, center, right, left surround, right surround and a limited-bandwidth subwoofer channel] are encoded on a bit-rate reduced data stream), data/text additions, album pictures, etc. If second data stream 730 is an enhancement to first data stream 710, the channel data select combines the two (2) data streams such that the combined signal has a data rate greater than the first data stream's 710 data rate, e.g., 64 kbps. Thus, the sixteen (16) kbps data rate of second data stream 730 acts to increase the rate of first data stream 710 from forty-eight (48) kbps to sixty-four (64) kbps. Combined data stream 758 is then decoded at step 752 and passed to an output unit at step 756. In an exemplary embodiment, when switching from first data stream 710 to combined data stream 758, the increase in data rate is blended so as not to enable a quick change between first data stream 710 and combined data stream 758. If second data stream 730 is determined to be invalid, the channel data select switches to a "first data level" only implementation and sends first data stream 710 to be decoded at step 720. The data rate of first data stream 710 remains at its original forty-eight (48) kbps. In an exemplary embodiment of this inventive method, a decrease in data rate is blended so as not to enable a quick change between first data stream 710 and combined data stream 758. Assuming that second data stream 730 becomes or remains valid, the receiver decodes combined data stream 758 at step 752 and provides combined data stream 758 to an output unit at step 756.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. In a digital data transmission system including a transmitter for transmitting signals, a terrestrial repeater comprising:

a receiving unit for detecting at least one of a first transmit signal and a second transmit signal, the first transmit signal transmitted from a first communication satellite and produced when the transmitter modulates a primary and a secondary data on a first carrier wave associated with the first communication satellite, and the second transmit signal transmitted from a second communication satellite and produced when the transmitter modulates the primary and the secondary data on a second carrier wave associated with the second communication satellite, wherein said receiving unit comprises an antenna in communication with a tuner unit for receiving the first and the second transmit signals, wherein the primary and the secondary data are modulated on the first and the second carrier waves using a M-PSK modulating scheme, said receiving unit is adapted to receive the first and the second transmit signals. the first and the second transmit signals including primary data comprising one of OPSK, D-OPSK, and pi/4 D-OPSK modulated data, and said receiving unit is adapted to receive the first and the second transmit signals, the first and the second transmit signals including secondary data comprising modulated data in the form of a phase offset relative to the modulated primary data;

an encoder for re-encoding the primary and the secondary data on a third carrier wave to form a third transmit signal; and a re-transmitter for transmitting the third transmit signal to a receiver.

2. The repeater of claim 1 wherein said receiving unit is adapted to receive the first and the second transmit signals, the first and the second transmit signals including secondary data comprising BPSK modulated data.

3. The repeater of claim 1 wherein said receiving unit is adapted to receive the first and the second transmit signals, the first and the second transmit signals including the modulated primary data, wherein the primary data is encoded with a first number of information bits per symbol.

4. The repeater of claim 3 wherein said receiving unit is adapted to receive the first and the second transmit signals, the first and the second transmit signals including the modulated secondary data, wherein the secondary data is encoded with a second number of information bits per symbol that is lower than the first number of information bits.

5. The repeater of claim 3 wherein said receiving unit is adapted to receive the first and the second transmit signals, the first and the second transmit signals including the modulated primary data encoded with 2 bits per symbol.

6. The repeater of claim 4 wherein said receiving unit is adapted to receive the first and the second transmit signals, the first and the second transmit signals including the modulated secondary data encoded with the 1 bit per symbol.

7. The repeater of claim 1 wherein said receiving unit is adapted to receive the first and the second transmit signals, the first and the second transmit signals each comprising 8-PSK modulated data.

8. The repeater of claim 1 wherein said receiving unit is adapted to receive the first and the second transmit signals, the first and the second transmit signals each comprising non-uniform 8-PSK modulated data.

9. The repeater of claim 1 wherein said receiving unit is adapted to receive first and the second transmit signals, the first and the second transmit signals each comprising Gray coded 8-PSK modulated data.

10. The repeater of claim 3 wherein said receiving unit is adapted to receive the third transmit signal encoded with a third number of information bits per symbol, the third number of information bits per symbol greater than the first and the second numbers of information bits per symbol.

11. The repeater of claim 10 wherein said receiving unit is adapted to receive the third transmit signal encoded with 3 bits per symbol.

12. The repeater of claim 1 wherein said receiving unit is adapted to receive the third transmit signal, the third transmit signal comprising OFDM modulated data.

13. The repeater of claim 1 wherein said receiving unit is adapted to receive the first and the second transmit signals, the first and the second transmit signals each including secondary data spread over multiple symbols.

14. The repeater of claim 12 wherein said receiving unit is adapted to receive the first and the second transmit signals, the first and the second transmit signals each including secondary data spread over a multiple of 2 symbols.

15. The repeater of claim 12 wherein said receiving unit is adapted to receive the first and the second transmit signals, the first and the second transmit signals each including secondary data encoded to ensure a zero mean offset over the multiple symbols such that for each positive phase offset, there is a corresponding negative phase offset.

16. The repeater of claim 1 wherein said receiving unit is adapted to receive the first and the second transmit signals including primary data and secondary data, wherein the primary data is encoded with a different forward error correction algorithm than the secondary data.

17. The repeater of claim 14 wherein said receiving unit is adapted to receive the first and the second transmit signals, said signals including primary data encoded with one of a block forward error correction algorithm and a convolutional forward error correction algorithm and secondary data encoded with one of a turbo coding forward error correction algorithm and a low density parity check coding forward error correction algorithm.

18. In a satellite audio radio service system, a method for receiving transmitted data, the method comprising the steps of:

receiving a primary data stream and a secondary data stream from both a first communication satellite and a second communication satellite, the primary data stream having a first data rate and the secondary data stream having a second data rate;

determining the validity of said first and said second data streams; and hierarchically modulating the primary and the secondary data streams to form a combined data stream when the secondary data stream is determined to be an enhancement to the primary data stream, wherein the combined data stream has a third data rate greater than the first data rate.

19. The method of claim 17 further comprising the steps of interpreting the combined data signal and providing the information to an output unit.

20. In a digital data transmission system including a transmitter for transmitting signals, a terrestrial repeater comprising:

a receiving unit for detecting a first transmit signal and a second transmit signal, the first transmit signal transmitted from a first communication satellite and produced when the transmitter modulates a primary and a secondary data on a first carrier wave associated with the first communication satellite, and the second transmit signal transmitted from a second communication satellite and produced when the transmitter modulates the primary and the secondary data on a second carrier wave associated with the second communication satellite, wherein said receiving unit comprises an antenna in communication with a tuner unit for receiving the first and the second transmit signals, wherein the primary and the secondary data are modulated on the first and the second carrier waves using a M-PSK modulating scheme, said receiving unit is adapted to receive the first and the second transmit signals, the first and the second transmit signals including primary data comprising one of QPSK, D-QPSK, and pi/4 D-QPSK modulated data, and said receiving unit is adapted to receive the first and the second transmit signals, the first and the second transmit signals each including secondary data spread over multiple symbols;

an encoder for re-encoding the primary and the secondary data on a third carrier wave to form a third transmit signal; and a re-transmitter for transmitting the third transmit signal to a receiver.

21. The repeater of claim 20 wherein said receiving unit is adapted to receive the first and the second transmit signals, the first and the second transmit signals each comprising 8-PSK modulated data.

22. The repeater of claim 20 wherein said receiving unit is adapted to receive the first and the second transmit signals, the first and the second transmit signals each comprising non-uniform 8-PSK modulated data.

23. The repeater of claim 20 wherein said receiving unit is adapted to receive first and the second transmit signals, the first and the second transmit signals each comprising Gray coded 8-PSK modulated data.

24. The repeater of claim 20 wherein said receiving unit is adapted to receive the third transmit signal, the third transmit signal comprising OFDM modulated data.

25. The repeater of claim 20 wherein said receiving unit is adapted to receive the first and the second transmit signals, the first and the second transmit signals each including secondary data spread over a multiple of 2 symbols.

26. The repeater of claim 20 wherein said receiving unit is adapted to receive the first and the second transmit signals, the first and the second transmit signals each including secondary data encoded to ensure a zero mean offset over the multiple symbols such that for each positive phase offset, there is a corresponding negative phase offset.

27. The repeater of claim 20 wherein said receiving unit is adapted to receive the first and the second transmit signals including primary data and secondary data, wherein the primary data is encoded with a different forward error correction algorithm than the secondary data.

28. The repeater of claim 20 wherein said receiving unit is adapted to receive the first and the second transmit signals, said signals including primary data encoded with one of a block forward error correction algorithm and a convolutional forward error correction algorithm and secondary data encoded with one of a turbo coding forward error correction algorithm and a low density parity check coding forward error correction algorithm.

29. In a digital data transmission system including a transmitter for transmitting signals, a terrestrial repeater comprising:
  a receiving unit for detecting at least one of a first transmit signal and a second transmit signal, the first transmit signal transmitted from a first communication satellite and produced when the transmitter modulates a primary and a secondary data on a first carrier wave associated with the first communication satellite, and the second transmit signal transmitted from a second communication satellite and produced when the transmitter modulates the primary and the secondary data on a second carrier wave associated with the second communication satellite comprising OFDM modulated data;
  an encoder for re-encoding the primary and the secondary data on a third carrier wave to form a third transmit signal; and
  a re-transmitter for transmitting the third transmit signal to a receiver wherein said receiving unit is adapted to receive the third transmit signal, the third transmit signal comprising OFDM modulated signal is inserted.

30. The repeater of claim 29 wherein said receiving unit comprises an antenna in communication with a tuner unit for receiving the first and the second transmit signals, wherein the primary and the secondary data are modulated on the first and the second carrier waves using a M-PSK modulating scheme.

31. The repeater of claim 29 is adapted to receive the first and the second transmit signals, the first and the second transmit signals including primary data comprising one of QPSK, D-QPSK, and pi/4 D-QPSK modulated data.

32. The repeater of claim 29 wherein said receiving unit is adapted to receive the first and the second transmit signals, the first and the second transmit signals each comprising 8PSK modulated data.

33. The repeater of claim 29 wherein said receiving unit is adapted to receive the first and the second transmit signals, the first and the second transmit signals each comprising non-uniform 8-PSK modulated data.

34. The repeater of claim 29 wherein said receiving unit is adapted to receive first and the second transmit signals, the first and the second transmit signals each comprising Gray coded 8-PSK modulated data.

35. The repeater of claim 29 wherein said receiving unit is adapted to receive the first and the second transmit signals, the first and the second transmit signals each including secondary data spread over a multiple of 2 symbols.

36. The repeater of claim 29 wherein said receiving unit is adapted to receive the first and the second transmit signals, the first and the second transmit signals each including secondary data encoded to ensure a zero mean offset over the multiple symbols such that for each positive phase offset, there is a corresponding negative phase offset.

37. The repeater of claim 29 wherein said receiving unit is adapted to receive the first and the second transmit signals including primary data and secondary data, wherein the primary data is encoded with a different forward error correction algorithm than the secondary data.

38. The repeater of claim 29 wherein said receiving unit is adapted to receive the first and the second transmit signals, said signals including primary data encoded with one of a block forward error correction algorithm and a convolutional forward error correction algorithm and secondary data encoded with one of a turbo coding forward error correction algorithm and a low density parity check coding forward error correction algorithm.

* * * * *